INVENTOR.
SAHAG DARDARIAN
BY Herbert L. Harris
ATTORNEY

INVENTOR.
SAHAG DARDARIAN
BY
ATTORNEY

United States Patent Office 3,297,395
Patented Jan. 10, 1967

3,297,395
OFF AXIS ADAPTER FOR USE WITH A
SUN SENSOR DEVICE
Sahag Dardarian, Ridgefield, N.J., assignor to The Bendix Corporation, Teterboro, N.J., a corporation of Delaware
Filed July 1, 1963, Ser. No. 291,660
7 Claims. (Cl. 350—285)

This is a continuation-in-part as to all common subject matter of a U.S. application Serial No. 276,912, filed April 30, 1963, by Sahag Dardarian, for a Fine Sun Sensor Device, and assigned to The Bendix Corporation.

This invention relates to an off-axis adapter for use with a sun sensor device of a type disclosed and claimed in the aforenoted U.S. application Serial No. 276,912, and more particularly to a device including a pair of adjustable optical wedges to effect deviations of the sun rays relative to the optical axis of the sun sensor device so as to cause the sun sensor device to provide output signals for controlling, for example, the position of a spacecraft carrying the device in a predictable relationship to the sun.

In the maneuvering of a spacecraft, a precise aerospace device of type such as described and claimed in the aforenoted U.S. application Serial No. 276,912 has been devised so that the sun may be used as a reference point for controlling the attitude of the spacecraft. Such device makes it possible for spaceborne detecting and sensing equipment to be aimed with great accuracy at selected areas of the universe. With such a device, the center of the sun may be pin pointed with an accuracy which will provide a precise reference relative to the solar system.

The sun sensor device of the aforenoted type is designed for installation on a spacecraft like a radar probe on an aircraft and the sun sensor device may be aimed dead center at the sun, as explained in the aforenoted application Serial No. 276,912, so as to effect electrical pulses to determine deviation from the center of the sun when the spacecraft changes attitude.

Such sun sensor device may be effective when the sun is in the field of view of the sensing device. However, if it is required to point the optical axis of the sun sensor device toward a point outside its field of view, the off-axis adapter forming the subject matter of the present invention may be used to fulfill this requirement.

An object of the invention, therefore, is to provide a novel adapter device for use with the sun sensor device of the aforenoted U.S. application Serial No. 276,912 and which includes a pair of optical wedges each separately driven by a stepper motor as commanded from the ground through a telemetering link so that incoming off-axis light rays from the sun may be deviated as required.

Another object of the invention is to provide an off-axis adapter of the aforenoted type including a novel selectively operable shutter so arranged that in one position thereof undeviated light rays from the sun may enter a main opening in the adapter and pass into the sun sensor device or alternately in a second position thereof the shutter may be adjusted so that off-axis rays of the sun may be deviated by adjustable optical wedges as required and applied to the sun sensor device.

Another object of the invention is to provide a suitable operator-operative means to angularly position the aforenoted shutter so as to selectively effect a dead center and off-axis action of the adapter.

Another object of the invention is to provide a novel shutter means for selectively effecting the foregoing action of the off-axis adapter and which shutter may be operative through a suitable telemetering link from a ground based input signal.

Another object of the invention is to provide a novel off-axis adapter including means for off-axis pointing and scanning so as to effect predetermined deviations in the rays from the sun and other means for shifting the operation of the off-axis adapter so as to permit the rays from the sun to enter directly into the sun sensor device.

These and other objects and features of the invention are pointed out in the following description in terms of the embmodiment thereof which is shown in the accompanying drawings. It is to be understood, however, that the drawings are for the purpose of illustration only and are not a definition of the limits of the invention. Reference is to be had to the appended claims for this purpose.

Figure 1:
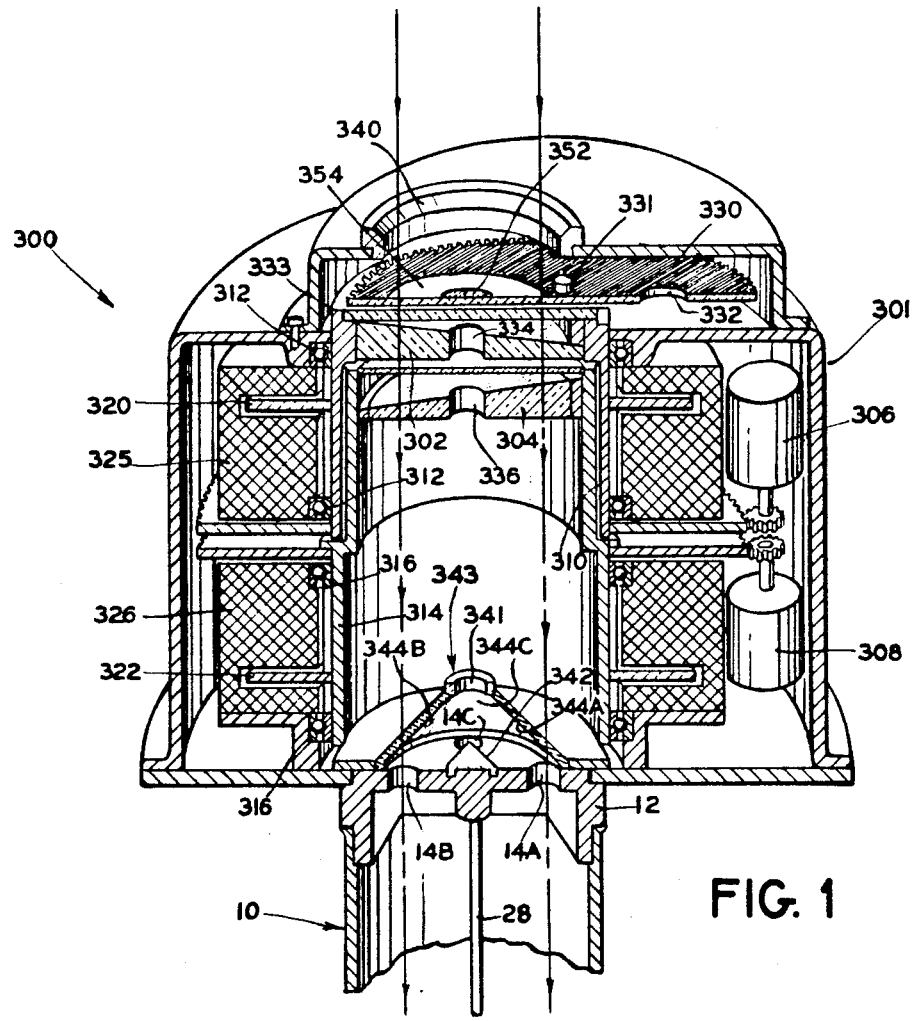
FIGURE 1 is a sectional assembly view of an off-axis adapter device embodying the invention.
Figure 3:
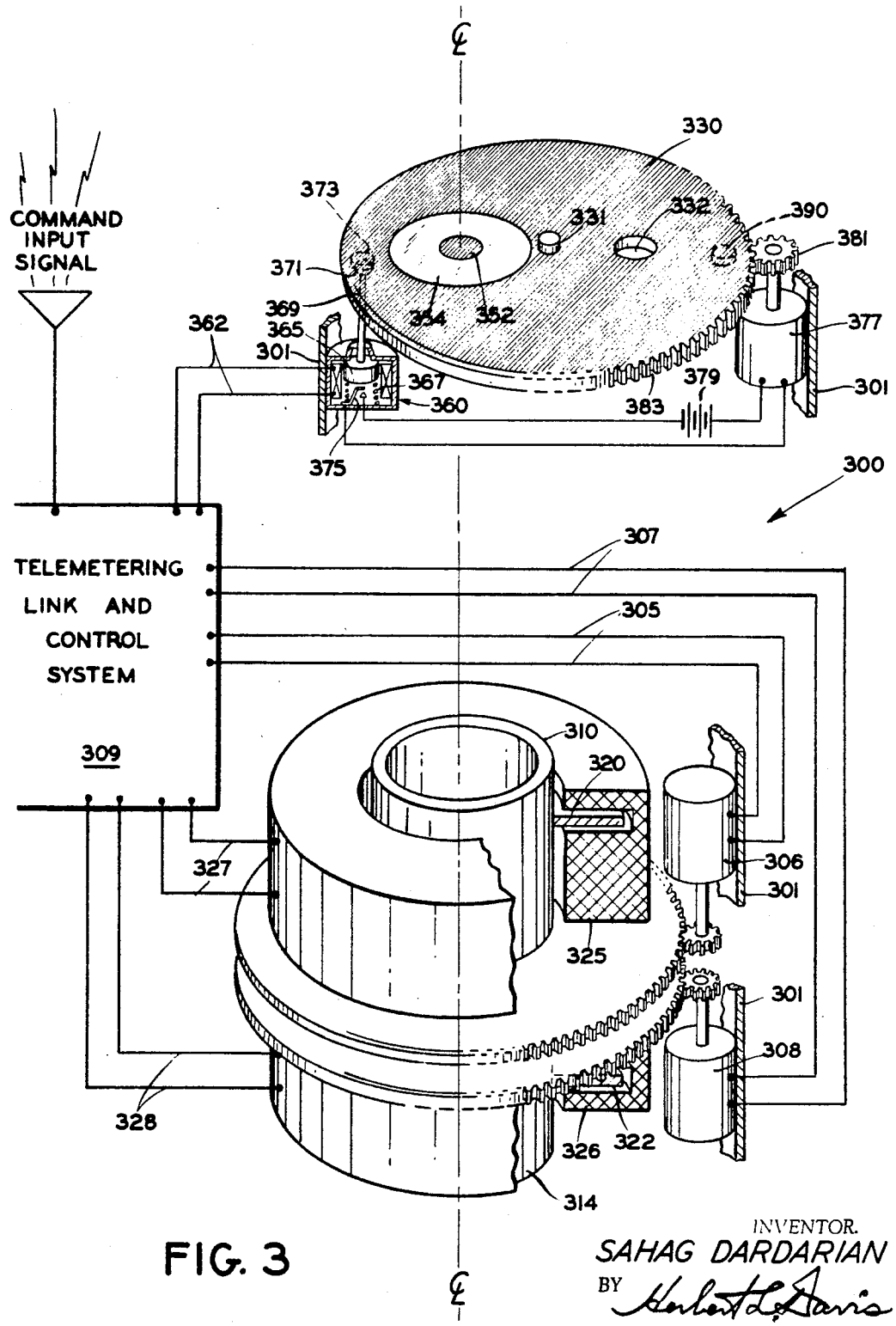

FIGURE 3 is a fragmentary perspective view of a novel shutter for use in the off-axis adapter of FIGURE 1 and showing the actuating motor and electrical pulse control locking solenoid for the shutter device together with a schematic illustration of the control system for the shutter and encoding discs for operation of the digital stepper motors for positioning the optical wedges under control of a command input signal applied through a telemetering link and control system therefor.

Figure 2:
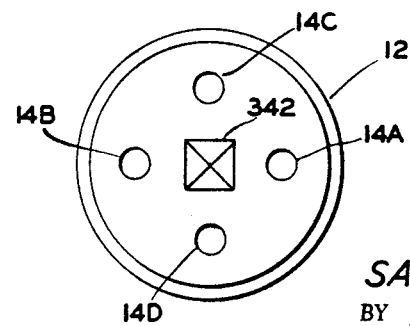
FIGURE 2 is an end view of the sun sensor device partially shown in FIGURE 1 and illustrating the apertures therein through which rays from the sun are directed by the off-axis adapter of FIGURE 1.

Referring to the drawing of FIGURE 1, the off-axis adapter 300 is designed to fit over the end of a mounting flange 12 of a sun sensor device 10 shown in FIGURE 2 and which may be of a type disclosed and claimed in the copending U.S. application Serial No. 276,912.

Off-axis-adapter

The adapter 300 includes a casing 301 in which there is incorporated a pair of optical wedges 302 and 304 driven separately by digital stepper motors 306 and 308 through a tubular member or sleeve 310 rotatably mounted on bearings 312 and a tubular member or sleeve 314 rotatably mounted on bearings 316. The stepper motors 306 and 308 have the casing thereof suitably fastened to the inner surface of the casing 301.

Optical encoder discs 320 and 322 are operatively connected through the sleeves 310 and 314, respectively, to each wedge 302 and 304. The encoder discs 320 and 322 are each arranged to cooperate with suitable position responsive signal means of encoder disc readout devices 325 and 326 of a conventional type arranged to effect signals for providing angle position readout, such as described in the Elliott U.S. Patent No. 2,659,828 That is, each of the discs 320 and 322 may be of a conventional type formed of a transparent material carrying radial markings in a number of circular tracks concentric with each other and with the center of the disc. The radial markings of the concentric tracks in each disc corresponding to digital information depending on the angular position of the disc.

Each of the readout devices 325 and 326 may comprise a plurality of lights cutting each track of the discs 320 and 322 respectively in the same concentric track formation. Behind the radial markings in the discs 320 and 322 may be located an array of separate photodetectors, one positioned above each track so that light rays passing through the transparent discs may impinge on the photodetectors and be interrupted by the radial markings on the discs depending on the angular position thereof. As the discs 320 and 322 rotate, the light rays from the plurality of lights pass through the discs and are interrupted by the radial markings to selectively render effective the photodetectors and thereby the digital information corresponding to the angular positions of the discs 320 and 322 in a conventional manner. The signals from the photodetectors then give the angular position of the discs.

A digital servo or other suitable means may be used to control each of the motors 306 and 308 to position each wedge 302 and 304 so that incoming light is deviated for off-axis pointing of the sun sensor on a space craft on which the same may be mounted. The foregoing may produce an error signal which may be used by a conventional control system 309 of the space craft for repositioning the body mounted sensor to obtain the desired off-axis pointing.

The command signals may be applied through lines 305 and 307 leading from the control system 309 for controlling the motors 306 and 308 so as to adjust the wedges 302 and 304 to selected positions while the encoding discs 320 and 322 in cooperation with the encoder disc readout devices 325 and 326 may effect control signals applied through lines 327 and 328 to readout the adjusted wedge positions in a conventional manner. When the discs 320 and 322 have stepped to the commanded position, the difference between the digital command and that produced by the offset pointer will be zero and the stepping ceases.

In order to ease the requirements for accurately positioning the wedges 302 and 304, an alternate optical path is provided. When no deviation is required, a shutter 330 is provided which may be rotated about a pivot 331 one hundred and eighty degrees (180°) from the position shown in FIGURES 1 and 3 so as to position an opening therein 332 in alignment with openings 334 and 336 in the optical wedges 302 and 304. Undeviated light rays from the sun may then enter a main opening 340 in one end of the casing 301 of the adapter and pass through the opening 332 in the shutter 330, a suitable light filter or transparent disc 333 and in turn through the openings 334 and 336 so as to be directed through an opening 341 in a pyramidal mirror structure 343 at the opposite end of the casing 301 onto a beam splitting pyramidal device 342 positioned within the mirror structure 343 and carried by the flange 12 of the sun sensor device 10.

The reflected light rays are then directed by the beam splitting pyramidal device 342 towards four front surfaced half silvered mirrors of the mirror structure 343, three of the mirrors are shown in FIGURE 1 and indicated by the numerals 344A, 344B, and 344C. The four partial mirrors 344 are arranged in a pyramidal fashion and so geometrically arranged as to operate in conjunction with the beam splitter 342 to cause the light rays to enter through apertures 14A, 14B, 14C, and 14D in the sun sensor device 10 whereupon the sun sensor device 10 will operate as heretofore described in the aforenoted U.S. application Serial No. 276,912.

When deviation in the light rays is desired, the shutter 330 may be rotated to the position shown in FIGURE 1 in which position an opaque center portion 352 will occult the openings 334 and 336 while an annular transparent portion 354 permits the light rays entering through the main opening 340 to be directed through the light filter or transparent disc 333 and then through the optical wedges 302 and 304 so as to effect a deviation in the light rays which is a function of the angular position of each of the optical wedges 302 and 304.

The deviated light rays then pass through the half silvered mirrors 344 and enter through the apertures 14A, 14B, 14C, and 14D, into the sun sensor device 10.

The angular position of the shutter 330 about the pivot 331 may be effected, as shown in FIGURE 3 by a suitable solenoid operating latch mechanism indicated generally by the numeral 360 controlled by an electrical pulse applied to the lines 362, as indicated in FIGURE 3, from the telemetering link and control system 309. The solenoid 360 may have the casing thereof suitably fastened to the inner surface of the casing 301, as shown in FIGURE 3.

The electrical pulse applied through the lines 362 is effective to energize the solenoid 360 to actuate a plunger 365 normally biased by a spring 367 to the upper position shown. The plunger 365 slidably positions a resilient rod 369 at the free end of which is positioned a ball detent 371 adapted to cooperate with an aperture 373 provided in the underside of the shutter 330. Upon energization of the solenoid 360, the plunger 365 is actuated against the biasing force of the spring 367 moving the ball detent 371 out of engaging relation in the aperture 373 whereupon the plunger 365 closes a switch 375 which completes a circuit for connecting a motor 377 to a source of electrical energy 379. The motor 377 also has the casing thereof suitably fastened to the inner surface of the casing 301, as shown in FIGURE 3.

The motor 377 thereupon drives a pinion 381 in toothed engagement with suitable gear teeth 383 in the periphery of the shutter 330 whereupon the ball detent 371 bears on the lower surface of the shutter 330 to maintain the switch 375 closed after de-energization of the solenoid 360 by cessation of the energizing electrical pulse.

The motor 377 then drives the shutter 330 one hundred and eighty degrees from a position in which, for example, the opaque center 352 serves to occult the opening 334, to another position in which the opening 332 in the shutter may be positioned in alignment with the openings 334 and 336.

Upon the shutter 330 being rotatably adjusted to the other position, an aperture 390 formed in the underside of the shutter 330 will coincide with the ball detent 371 whereupon the plunger 365 under force of the spring 367 will bias the ball detent 371 into the aperture 390.

The plunger 365 under the biasing force of the spring 367 will permit the spring arm switch 375 to move out of a closed position so as to open the energizing circuit to the motor 377 whereupon the motor 377 stops driving the shutter 330.

Further, the resilient rod 369 in biasing the detent ball 371 into engaging relation in the apperture 390 may permit the motor 377 to slightly overdrive the shutter 330 which may be then brought back into the desired aligned position by the resilient force of the arm 369 acting on the shutter 330 in its engaging relation in the aperture 390.

The shutter 330 may be returned to the previous position upon the solenoid 360 being once again energized by an electrical pulse applied through the lines 362. The operation is thereupon repeated and the motor 377 drives the shutter 330 one hundred and eighty degrees from the last position to the previous position in which ball detent 371 once again cooperates with the aperture 373 to open the switch 375 and stop the rotation of the motor 377 with the shutter 330 in the relative position shown in FIGURES 1 and 3.

There is shown schematically in FIGURE 3, the off-axis adapter 300 operatively connected to the telemetering link and control system 309 which may be of a conventional type and so arranged that the off-axis adapted 300 may be adjustably controlled from the ground through suitable transmission signals received by the telemetering link and control system 309.

*Operation*

It will be seen then from the foregoing that if it is required to point the optical axis of the sun sensor 10 towards a point outside its normal field of view, the off-axis adapter 300 may be utilized to fulfill this requirement.

Thus, if the shutter 330 be positioned so as to allow light rays from the sun to enter through the hole 332 in the shutter and thereby through the holes 334 and 336 in the prisms 302 and 304, the adapter 300 will permit an unmodified field of view. The adapter in this mode of operation has no effect on the entering rays of light, and thus it adds no error or deviation in the light rays to the system.

However, upon the shutter 330 being angularly adjusted by operation of the motor 337 so that the holes 334 and 336 are occulted by the opaque portion 352 of the shutter 330, the light rays entering the off-axis adapter 300 must then pass through a transparent portion 354 in the shutter 330 and through the prisms 302 and 304. If the wedges 302 and 304 deviate the rays of light from the sun by virtue of their angular positions, the sun sensor 10 must then be offset an equal angle to bring the light emerging from the prisms 302 and 304 back on an optical axis of the instrument. Thus, if the wedges 302 and 304 are in a position where the deviation of the light rays due to one prism is not equal and opposite to the deviation produced by the other prism, the optical axis of the sun sensor 10 will be pointed to a point outside the field of view of the sun sensor 10.

The position of the wedges 302 and 304 are controlled by the respective motors 306 and 308 which in turn may be commanded to their adjusted positions by a ground command signal via the telemetering link and control system 309. In order that the image may be kept in the field of view of the sun sensor 10 even though the command is large enough to deviate it out of the field of view, a synchronizer may be provided which programs the input such that the error developed between the sun sensor optical axis, which is coincident with an imaginary line on a space vehicle, and the deviated light rays is not greater than the field of view of the sun sensor or the maximum useable electrical error signal that the space crafts control system can accommodate.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. An off-axis adapter for use with a sun sensor device, comprising a casing having a main opening at one end for receiving light rays from the sun,
  a pair of optical wedges adjustably mounted in said casing,
  each of said optical wedges having an opening therein positioned in alignment one with the other and with said main opening for the passage of light rays therethrough,
  a shutter interposed between said main opening and the optical wedges,
  said shutter including an opaque portion for occulting the openings in said wedges for preventing the passage of the light rays through said openings in one adjusted position of the shutter,
  said shutter including a transparent portion about the opaque portion effective in said one adjusted position of the shutter to permit light rays entering through the main opening to be directed through the optical wedges so as to effect a deviation in the light rays as a function of the angular positions of each of the optical wedges,
  said shutter having an opening therein effective in a second adjusted position of the shutter to permit the passage of light rays from the main opening in said casing through the openings in the optical wedges,
  and light transmitting means at an opposite end of the casing cooperating with said optical wedges for directing light rays passing therethrough into said sun sensor device.

2. The combination defined by claim 1 in which said light transmitting means comprises a pyramidal mirror structure including four partial mirrors so arranged as to permit the deviated light rays from said optical wedges to pass through said partial mirrors to said sun sensor device,
  said pyramidal mirror structure including an opening therein positioned in alignment with the openings in said optical wedges,
  and a beam splitter device positioned within the pyramidal mirror structure and in alignment with said openings,
  said beam splitter device being geometrically arranged in cooperative relation with said partial mirrors so as to cause light rays entering through said opening in the pyramidal mirror structure to be reflected to the partial mirrors and thereby into said sun sensor device.

3. The combination defined by claim 1 including an electric motor for adjustably positioning the shutter,
  a solenoid,
  a plunger actuated by the solenoid,
  a switch operated by the plunger for controlling energization of the motor,
  a ball detent positioned by said plunger,
  said shutter having a first aperture therein cooperating with said ball detent in said one adjusted position of the shutter,
  and said shutter having a second aperture cooperating with said ball detent in said second adjusted position of the shutter,
  spring means for biasing the plunger and the ball detent positioned thereby into engaging relation in one of said apertures after de-energization of the solenoid,
  and said plunger being actuated in opposition to said spring means upon energization of said solenoid so as to close said switch and to actuate said ball detent out of cooperative relation in said apertures,
  and upon subsequent angular adjustment of the shutter by the motor the ball detent bears upon a surface of the shutter so as to effectively hold the plunger in a position for maintaining the switch closed upon deenergization of the solenoid until such time as the shutter may be adjustably positioned so as to bring one of said apertures into cooperative relation with said ball detent whereupon said spring means biases the plunger to a position for opening said switch.

4. The combination defined by claim 1 including a first tubular member having one of said optical wedges mounted therein,
  said first tubular member being rotatably mounted in said casing for adjustably positioning said one optical wedge,
  a second tubular member having the other of said optical wedges mounted therein,
  said second tubular member being rotatably mounted in said casing for adjustably positioning the other of said optical wedges,
  a first motor mounted in said casing for rotatably positioning said first tubular member,
  a second motor mounted in said casing for rotatably positioning said second tubular member,
  said first and second motors being operative so as to angularly adjust the optical wedges through said tubular members to effect a deviation of the light rays from the sun as a function of the angular position of each of the optical wedges.

5. The combination defined by claim 1 including a first tubular member having one of said optical wedges mounted therein,
  said first tubular member being rotatably mounted in said casing for adjustably positioning said one optical wedge,
  a second tubular member having the other of said optical wedges mounted therein,
  said second tubular member being rotatably mounted in said casing for ajustably positioning the other of said optical wedges, a first motor mounted in said casing for rotatably positioning said first tubular member, a second motor mounted in said casing for rotatably positioning said second tubular member, said first and second motors being operative so as to angularly adjust the optical wedges through said tubular members to effect a deviation of the light rays from the sun as a function of the angular position of each of the optical wedges, a first position sensing means operative by said first tubular member for effecting a signal as a function of the angular position of said one optical wedge, and a second position sensing means operative by the second tubular member for effecting a signal as a function of the angular position of the other of said optical wedges.

6. The combination defined by claim 2 including an electric motor for adjustably positioning the shutter, a solenoid, a plunger actuated by the solenoid, a switch operated by the plunger for controlling energization of the motor, a ball detent positioned by said plunger, said shutter having a first aperture therein cooperating with said ball detent in said one adjusted position of the shutter, and said shutter having a second aperture cooperating with said ball detent in said second adjusted position of the shutter, spring means for biasing the plunger and the ball detent positioned thereby into engaging relation in one of said apertures after de-energization of the solenoid, and said plunger being actuated in opposition to said spring means upon energization of said solenoid so as to close said switch and to actuate said ball detent out of cooperative relation in said apertures, and upon subsequent angular adjustment of the shutter by the motor the ball detent bears upon a surface of the shutter so as to effectively hold the plunger in a position for maintaining the switch closed upon de-energization of the solenoid until such time as the shutter may be adjustably positioned so as to bring one of said apertures into cooperative relation with said ball detent whereupon said spring means biases the plunger to a position for opening said switch.

7. The combination defined by claim 6 including a first tubular member having one of said optical wedges mounted therein, said first tubular member being rotatably mounted in said casing for adjustably positioning said one optical wedge, a second tubular member having the other of said optical wedges mounted therein, said second tubular member being rotatably mounted in said casing for adjustably positioning the other of said optical wedges, a first motor mounted in said casing for rotatably positioning said first tubular member, a second motor mounted in said casing for rotatably positioning said second tubular member, said first and second motors being operative so as to angularly adjust the optical wedges through said tubular members to effect a deviation of the light rays from the sun as a function of the angular position of the optical wedges, a first position sensing means operative by said first tubular member for effecting a signal as a function of the angular position of the first optical wedge, and a second position sensing means operative by the second tubular member for effecting a signal as a function of the angular position of the other of said optical wedges.

References Cited by the Examiner

UNITED STATES PATENTS

| | | | |
|---|---|---|---|
| 1,353,151 | 9/1920 | Deming | 88—57 X |
| 2,659,828 | 11/1953 | Elliott | 88—1 |
| 3,054,898 | 9/1962 | Westover et al. | 88—14 |

JEWELL H. PEDERSEN, *Primary Examiner.*

RONALD L. WIBERT, *Examiner.*

E. S. BAUER, *Assistant Examiner.*